United States Patent
Roffe et al.

(10) Patent No.: US 11,125,273 B1
(45) Date of Patent: Sep. 21, 2021

(54) BEARING CAGE ASSEMBLY INCLUDING METAL SHELL

(71) Applicant: Schaeffler Technologies AG & Co. KG, Herzogenaurach (DE)

(72) Inventors: Dennis Roffe, Fort Mill, SC (US); Ronald Taylor, York, SC (US); Guihui Zhong, Charlotte, NC (US); Michael Heaton, Rock Hill, SC (US)

(73) Assignee: SCHAEFFLER TECHNOLOGIES AG & CO. KG, Herzogenaurach (DE)

( * ) Notice: Subject to any disclaimer, the term of this patent is extended or adjusted under 35 U.S.C. 154(b) by 0 days.

(21) Appl. No.: 16/820,109

(22) Filed: Mar. 16, 2020

(51) Int. Cl.
*F16C 33/38* (2006.01)

(52) U.S. Cl.
CPC ...... *F16C 33/3831* (2013.01); *F16C 33/3875* (2013.01)

(58) Field of Classification Search
CPC .............. F16C 33/3831; F16C 33/3862; F16C 33/3868; F16C 33/3875; F16C 33/4611; F16C 33/4641; F16C 33/4647; F16C 33/4652
See application file for complete search history.

(56) References Cited

U.S. PATENT DOCUMENTS 3,162,493 A * 12/1964 Hanau ................... F16C 33/565
  384/527

FOREIGN PATENT DOCUMENTS

DE     857458   *  7/1949
EP    2716924   *  4/2014

OTHER PUBLICATIONS

U.S. Appl. No. 16/751,917, filed Jan. 24, 2020 (unpublished).

* cited by examiner

*Primary Examiner* — James Pilkington
(74) *Attorney, Agent, or Firm* — Volpe Koenig

(57) ABSTRACT

A bearing cage assembly is disclosed herein that includes a first cage half formed as a plastic cage and a second cage half formed as a metal shell. The first cage half includes a first base rim and a first plurality of arms extending axially from the first base rim. The second cage half includes a second base rim and a second plurality of arms extending axially from the second base rim. The second plurality of arms are each formed by a first flange and a second flange. The first flange and the second flange are spaced apart from each other in a radial direction to define a receptacle dimensioned to receive a respective one of the first plurality of arms. Free ends of the first flange and the second flange are crimped over to retain the first cage half with the second cage half.

14 Claims, 4 Drawing Sheets

BEARING CAGE ASSEMBLY INCLUDING METAL SHELL

FIELD OF INVENTION

The present disclosure relates to bearing cage assembly for high speed applications.

BACKGROUND

Fuel efficiency is an increasing consumer demand due to environmental considerations. In order to improve fuel efficiency, drive arrangements in automobiles and other vehicles are increasingly using electrical drive components and motors. Electric motors require special bearings to accommodate high rotational speeds experienced by components in electric motors.

Cages are used in bearing assemblies to maintain spacing between rolling elements. Bearing cages were traditionally formed from a single-piece, unitary component. In order to accommodate the high speeds, cage designs are increasingly relying on two-piece or hybrid cage configurations. One type of two-piece cage is formed entirely from plastic, which is not suitable for the high rotational speeds (i.e. 50,000 rpm) experienced by electric motors. Existing two-piece plastic cages typically experience failure around 30,000 rpm and are not able to withstand the performance demands of an electric motor.

It would be desirable to provide a light-weight, cost-effective, and reliable bearing cage that performs at high rotational speeds.

SUMMARY

An improved bearing cage for a high speed application is disclosed herein.

The bearing cage assembly includes a first cage half formed as a plastic cage and a second cage half formed as a metal shell. The first cage half includes a first base rim and a first plurality of arms extending axially from the first base rim. A first half of a plurality of rolling element pockets are defined between the first plurality of arms.

The second cage half includes a second base rim and a second plurality of arms extending axially from the second base rim. A second half of a plurality of rolling element pockets are defined between the second plurality of arms. The second plurality of arms are each formed by a first flange and a second flange. The first flange and the second flange are spaced apart from each other in a radial direction to define a receptacle dimensioned to receive a respective one of the first plurality of arms.

Free ends of the first flange and the second flange are crimped over to retain the first cage half with the second cage half.

In one embodiment, the second cage half is formed from stamped sheet metal. The second cage half can have a uniform thickness.

In one embodiment, the first cage half includes a first plurality of recesses on a radially outer surface of the first plurality of arms, and a second plurality of recesses on a radially inner surface of the first plurality of arms. The first plurality of recesses and the second plurality of recesses can each extend between a first axial end face and a second axial end face of the cage.

In one embodiment, a thickness ($t_2$) of the metal shell forming the second cage half is less than 20% of a thickness ($t_1$) of the plastic cage forming the first cage half in a region of the first and second plurality of recesses.

In one embodiment, the first flange is positioned radially inward from the second flange, the first flange has a first circumferential extent ($C_1$) and the second flange has a second circumferential extent ($C_2$), and the first circumferential extent ($C_1$) is less than the second circumferential extent ($C_2$).

The first flange and the second flange each extend circumferentially between adjacent pockets of the second half of the plurality of rolling element pockets.

The metal shell can encompass a majority of the plastic cage. The metal shell forming the first cage half defines a radially innermost surface of the bearing cage assembly and a radially outermost surface of the bearing cage assembly. The metal shell forming the first cage half defines both axially outermost end faces of the bearing cage assembly.

Additional embodiments are disclosed herein.

BRIEF DESCRIPTION OF THE DRAWINGS

The foregoing Summary and the following Detailed Description will be better understood when read in conjunction with the appended drawings, which illustrate a preferred embodiment of the disclosure. In the drawings.

DETAILED DESCRIPTION OF THE PREFERRED EMBODIMENTS

Figure 1:
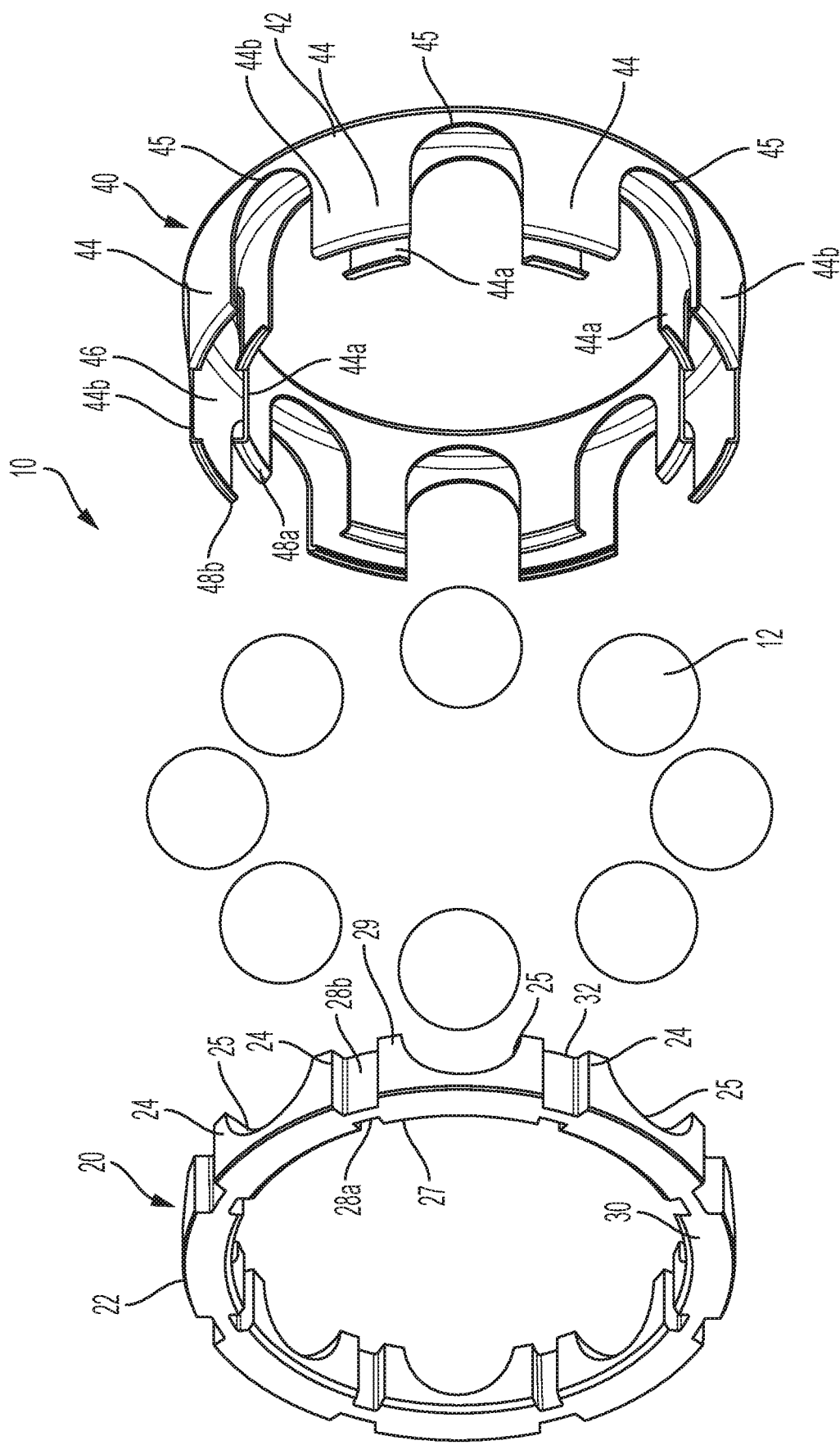
FIG. 1 is an exploded view of a bearing cage assembly according to an embodiment.
Figure 2:
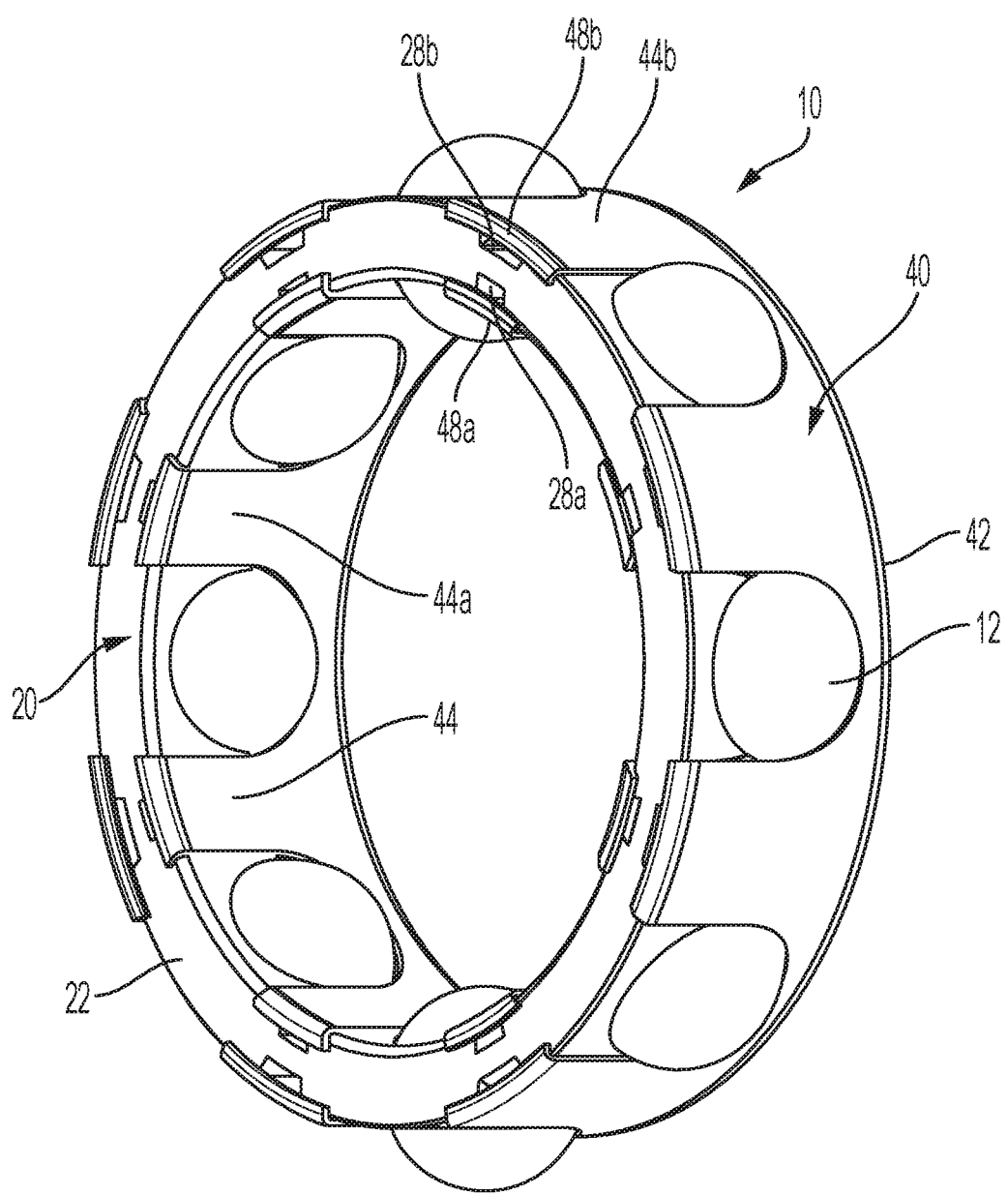
FIG. 2 is perspective view of the bearing cage assembly of FIG. 1 in an assembled state.

Certain terminology is used in the following description for convenience only and is not limiting. "Axially" refers to a direction along an axis (X) of an assembly. "Radially" refers to a direction inward and outward from the axis (X) of the assembly. "Circumferentially" refers to a direction extending along a curve or circumference of a respective element relative to the axis (X) of the assembly.

A reference to a list of items that are cited as "at least one of a, b, or c" (where a, b, and c represent the items being listed) means any single one of the items a, b, or c, or combinations thereof. The terminology includes the words specifically noted above, derivatives thereof and words of similar import.

A bearing cage assembly 10 is shown in the FIGS. 1-4. The bearing cage assembly 10 includes a first cage half 20 and a second cage half 40 and a plurality of rolling elements 12 supported therebetween. The two cage halves 20, 40 are joined to each other without the need for any separately formed fasteners.

The first cage half 20 is formed as a plastic cage. The plastic forming the first cage half 20 can be formed from a high heat polyamide. The first cage half 20 includes a first base rim 22 and a first plurality of arms 24 extending axially from the first base rim 22. A first half of a plurality of rolling element pockets 25 are defined between the first plurality of arms 24.

The second cage half 40 is formed as a metal shell. In one embodiment, the second cage half 40 is formed from stamped sheet metal. In one embodiment, the second cage half has a uniform thickness.

As used herein the term first cage half 20 is used interchangeably with the term plastic cage, and the term second cage half 40 is used interchangeably with the term metal shell.

In one embodiment, the metal shell forming the second cage half 40 is formed from steel. One of ordinary skill in the art would understand that other metals could be used.

The second cage half 40 includes a second base rim 42 and a second plurality of arms 44 extending axially from the second base rim 42. A second half of a plurality of rolling element pockets 45 are defined between the second plurality of arms 44. The second plurality of arms 44 are each formed by a first flange 44a and a second flange 44b. The first flange 44a and the second flange 44b are spaced apart from each other in a radial direction to define a receptacle 46 dimensioned to receive a respective one of the first plurality of arms 24.

Free ends 48a, 48b of the first flange 44a and the second flange 44b are bent or crimped over to retain the first cage half 20 with the second cage half 40. In this arrangement, the entire cage assembly is formed from two parts formed from different materials, i.e. a hybrid cage, without the need for any additional fastening elements.

In one embodiment, the first cage half 20 includes a first plurality of recesses 28b on a radially outer surface 29 of the first plurality of arms 24, and a second plurality of recesses 28a on a radially inner surface 27 of the first plurality of arms 24. The recesses 28a, 28b are provided to lower the overall mass of the cage assembly 10.

In one embodiment, the first plurality of recesses 28b and the second plurality of recesses 28a each extend completely between a first axial end face 30 and a second axial end face 32 of the cage 20.

Figure 4:
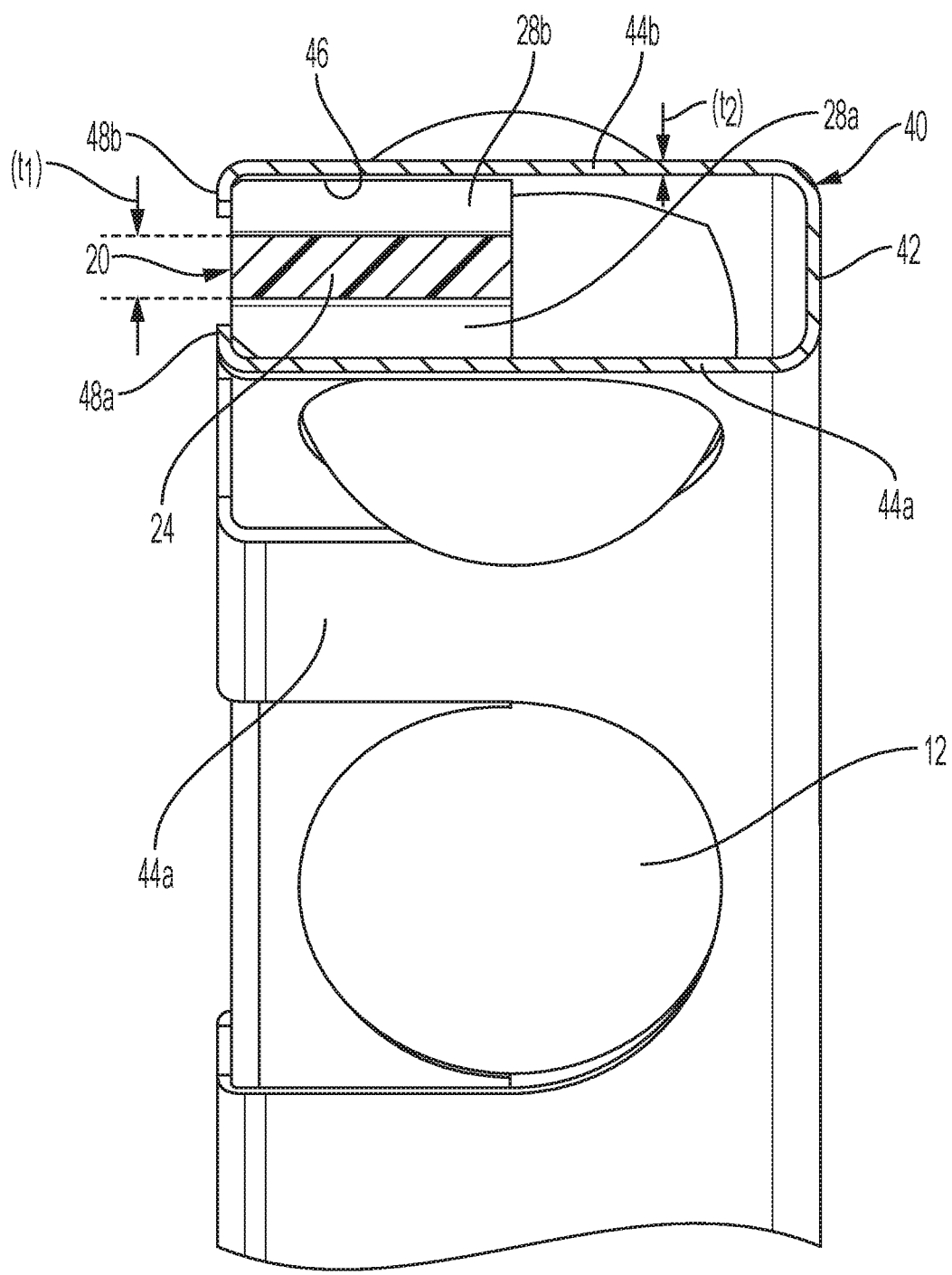
FIG. 4 is a partial cross-sectional view of the bearing cage assembly of FIG. 3 along line IV-IV.

As shown in FIG. 4, a thickness (t2) of the metal shell forming the second cage half 40 is less than 20% of a thickness (t1) of the plastic cage forming the first cage half 40 in a region of the first and second plurality of recesses 28a, 28b. One of ordinary skill in the art would understand that the thickness of the metal shell and the plastic cage can vary depending on the particular needs of a bearing application.

Figure 3:
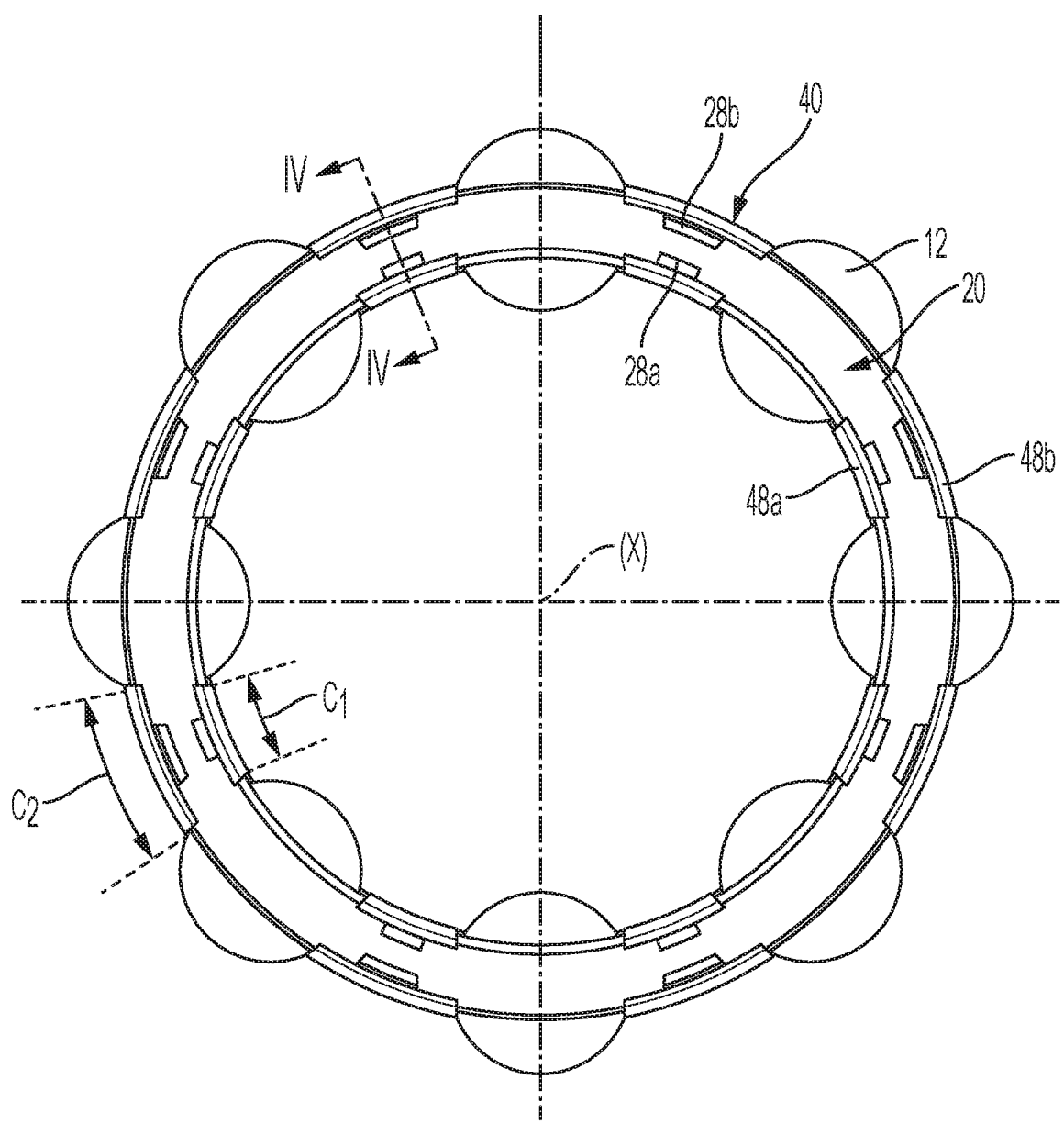
FIG. 3 is a front view of the bearing cage assembly of FIG. 2.

The first flange 44a is positioned radially inward from the second flange 44b. As shown in FIG. 3, the first flange 44a has a first circumferential extent (C1) and the second flange 44b has a second circumferential extent (C2), and the first circumferential extent (C1) is less than the second circumferential extent (C2). The dimensions of the flanges 44a, 44b can vary depending on the needs for a particular bearing application.

The first flange 44a and the second flange 44b extend circumferentially between adjacent pockets of the second half of the plurality of rolling element pockets 45.

The metal shell forming the first cage half 40 defines a radially innermost surface of the bearing cage assembly 10 and a radially outermost surface of the bearing cage assembly 10. In one embodiment, the metal shell forming the first cage half 40 defines both axially outermost end faces of the bearing cage assembly 10. In other words, the metal shell encapsulates a majority, i.e. more than 50%, of the plastic cage.

Although the assembly 10 disclosed herein is used in conjunction with ball bearings, one of ordinary skill in the art would understand that the assembly 10 can be adjusted to be used for cylindrical rollers or any other type of rolling element based on this disclosure.

A method of assembling the bearing cage assembly 10 is also disclosed herein. The method includes providing a first cage half 20 formed as a plastic cage and a second cage half 40 formed as a metal shell. The method includes aligning a first half of a plurality of rolling element pockets on the first cage half 20 with a second half of a plurality of rolling element pockets on the second cage half 40. The first cage half 20 and the second cage half 40 are connected to each other via crimping or bending free ends defined at the tips of flanges 44a, 44b defined on the second cage half 40, such that the crimped ends of the flanges 44a, 44b engage with the first cage half 20.

Having thus described the present disclosure in detail, it is to be appreciated and will be apparent to those skilled in the art that many physical changes, only a few of which are exemplified in the detailed description of the invention, could be made without altering the inventive concepts and principles embodied therein.

It is also to be appreciated that numerous embodiments incorporating only part of the preferred embodiment are possible which do not alter, with respect to those parts, the inventive concepts and principles embodied therein.

The present embodiment and optional configurations are therefore to be considered in all respects as exemplary and/or illustrative and not restrictive, the scope of the embodiments being indicated by the appended claims rather than by the foregoing description, and all alternate embodiments and changes to this embodiment which come within the meaning and range of equivalency of said claims are therefore to be embraced therein.

LOG OF REFERENCE NUMERALS bearing cage assembly 10
rolling elements 12
first cage half; plastic cage 20
first base rim 22
first plurality of arms 24
first half of rolling element pockets 25
radially inner surface 27
recesses 28a, 28b
radially outer surface 29
first axial end face 30 of cage
second axial end face 32 of cage
second cage half; metal shell 40
second base rim 42
second plurality of arms 44
first flange 44a
second flange 44b
second half of rolling element pockets 45
free ends 48a, 48b of arms

What is claimed is:

1. A bearing cage assembly comprising:
a first cage half formed as a plastic cage, the first cage half including a first base rim and a first plurality of arms extending axially from the first base rim;
a second cage half formed as a metal shell, the second cage half including a second base rim and a second plurality of arms extending axially from the second base rim, the second plurality of arms each being formed by a first flange and a second flange, the first flange and the second flange being spaced apart from each other in a radial direction to define a receptacle dimensioned to receive a respective one of the first plurality of arms; and
a plurality of rolling element pockets, wherein each pocket of the plurality of rolling pockets comprises a first half of a rolling element pocket and a second half of a rolling element pocket, wherein each first half of the plurality of rolling element pockets is defined between adjacent arms of the first plurality of arms, and each second half of the plurality of rolling element pockets is defined between adjacent arms of the second plurality of arms.

2. The bearing cage assembly of claim 1, wherein each first flange has one free end and each second flange has one free end, wherein the free end of each first flange and the free end of each second flange are crimped over to retain the first cage half within the second cage half.

3. The bearing cage assembly of claim 1, wherein the second cage half is formed from stamped sheet metal.

4. The bearing cage assembly of claim 3, wherein the second cage half has a uniform thickness.

5. The bearing cage assembly of claim 1, wherein the first cage half includes a first plurality of recesses, wherein each recess of the first plurality of recesses is located on a radially outer surface of one of the arms of the first plurality of arms, and a second plurality of recesses, wherein each recess of the second plurality of recesses is located on a radially inner surface of one of the arms of the first plurality of arms.

6. The bearing cage assembly of claim 5, wherein the first plurality of recesses and the second plurality of recesses each extend between a first axial end face and a second axial end face of the first cage half.

7. The bearing cage assembly of claim 5, wherein a thickness ($t_2$) of the metal shell forming the second cage half is less than 20% of a thickness ($t1$) of the plastic cage forming the first cage half in a region of the first and second plurality of recesses.

8. The bearing cage assembly of claim 1, wherein the first flange is positioned radially inward from the second flange, the first flange has a first circumferential extent ($C_1$) and the second flange has a second circumferential extent ($C_2$), and the first circumferential extent ($C_1$) is less than the second circumferential extent ($C_2$).

9. The bearing cage assembly of claim 1, wherein the metal shell forming the second cage half defines a radially innermost surface of the bearing cage assembly and a radially outermost surface of the bearing cage assembly.

10. The bearing cage assembly of claim 1, wherein the metal shell forming the second cage half defines axially outermost end faces of the bearing cage assembly.

11. A bearing cage assembly comprising:
a first cage half formed as a plastic cage, the first cage half including a first plurality of arms;
a second cage half formed as a metal shell, the second cage half including a second plurality of arms,
wherein the second plurality of arms include a first flange and a second flange defining a receptacle therebetween, the first plurality of arms are received within a respective receptacle defined between the first flange and the second flange, wherein each first flange has one free end and each second flange has one free end, and the free ends of each first flange and each second flange are crimped over to retain the first cage half within the second cage half; and
a plurality of rolling element pockets, wherein each pocket of the plurality of rolling pockets comprises a first half of a rolling element pocket and a second half of a rolling element pocket,
wherein each first half of the plurality of rolling element pockets is defined between adjacent arms of the first plurality of arms, and
each second half of the plurality of rolling element pockets is defined between adjacent arms of the second plurality of arms.

12. The bearing cage assembly of claim 11, wherein the second cage half is formed from stamped sheet metal and has a uniform thickness.

13. The bearing cage assembly of claim 12, wherein the first cage half includes a first plurality of recesses, wherein each recess of the first plurality of recesses is located on a radially outer surface of one of the arms of the first plurality of arms, and a second plurality of recesses, wherein each recess of the second plurality of recesses is located on a radially inner surface of one of the arms of the first plurality of arms, and the first plurality of recesses and the second plurality of recesses each extend between a first axial end face and a second axial end face of the first cage half.

14. The bearing cage assembly of claim 11, wherein the metal shell forming the second cage half defines a radially innermost surface of the bearing cage assembly and a radially outermost surface of the bearing cage assembly, and the metal shell defines axially outermost end faces of the bearing cage assembly.

* * * * *